United States Patent Office

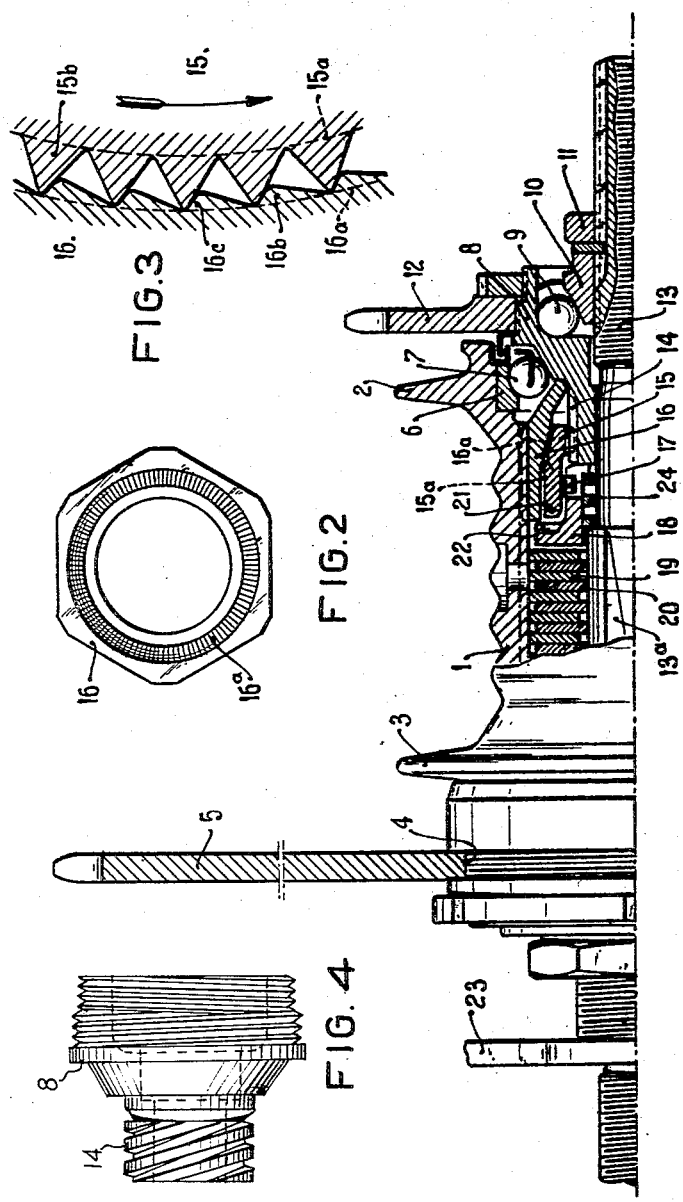

2,800,986
Patented July 30, 1957

---

2,800,986

FREEWHEEL HUBS, PREFERABLY PROVIDED WITH INTERNALLY ARRANGED BACK PEDALLING BRAKES, FOR A CYCLE WHEEL

Arie van der Plas, Brummen, Netherlands, assignor to Fijn-Mechanische Industrie Becker's Sons N. V., The Hague, Netherlands, a Dutch company Application February 17, 1956, Serial No. 566,278

Claims priority, application Netherlands February 21, 1955

1 Claim. (Cl. 192—6)

The invention relates to a freewheel hub, preferably a freewheel hub provided with an internally arranged back pedalling brake, for a cycle wheel, comprising a clutching member adapted to be axially reciprocated by means of a screw thread provided on a rotatable driving member and thereby to establish and to disconnect a cone-coupling between the driving member and the wheel hub, one of the two cooperating conical surfaces of said cone-coupling being provided with teeth, of which the flanks enclose an angle of 90° at the most and at least the surface layer is harder than the material of the second conical surface.

A freewheel hub provided with a cone-coupling of the type referred to is already known, in which the teeth of one conical surface extend with their crest lines parallel to the descriptive lines of said surface and are axially divided into portions by means of helical grooves but in which the counterconical surface has no teeth at all. The teeth have the object to reduce the danger of slipping of the cone-coupling and the helical grooves are meant for keeping the counterconical surface smooth under all circumstances. However, it has appeared that in practice the object aimed at is not completely attained.

The invention has the object to prevent the cone-coupling from slipping even after long-continued use of the freewheel hub. It consists in that the second conical surface of the cone-coupling is provided with saw-shaped teeth having a pitch equal to that of the teeth of the first conical surface and in that the operative flanks and the inoperative flanks of the latter teeth have slopes, which are equal to and steeper than the slopes of the operative flanks and the inoperative flanks of the saw-shaped teeth of the second conical surface, respectively.

This construction has several advantages. The flanks of the teeth of the first mentioned conical surface are relatively steep and the crest surface of said teeth is very narrow, so that even when little axial pressure is exerted on the clutching member, the movable cone of the coupling easily penetrates with its teeth the oil film left on the other conical surface and the cooperating teeth engage each other immediately with their maximum active areas. The result thereof is, that the greatest hold between the two parts of the coupling is obtained. Thus the saw-shaped teeth can be made very low, that means their height may be made about 0.0016"–0.004". Such low saw-shaped teeth have the advantage that the coupling operates almost noiseless during movement of the clutching member. Moreover the axial movement of said member necessary for the control of the coupling is very small. It further appeared that the low-saw-shaped teeth are continuously corrected by the hard teeth of the first conical surface, the teeth of which always penetrate as far as possible the spaces between the saw-shaped teeth. Thus the latter teeth are continuously forced into their right shape after having been accidentally deformed, so that even after a long-continued use of the freewheel hub the cone-coupling will have no tendency to slip.

It may be stated that a freewheel hub provided with a back pedalling brake and a cone-coupling arranged between the driving member and the wheel hub is already known, in which the two conical surfaces of the cone-coupling are both provided with saw-shaped teeth adapted to be brought into exactly fitting engagement. In this case the oil, which is left between the conical surfaces approaching each other can not escape quickly, so that there will always be left an oil film between the gentle sloping back flanks of said teeth. This constitutes the danger that when the teeth are made relatively low they will engage each other only with very narrow marginal portions of their operative flanks, so that the specific pressure exerted by said teeth on each other will become too heavy, the teeth will slip and thereby round off their crest portions. Due to this fact the teeth of a cone-coupling of this type must be made relatively high, which, however, has the disadvantage that not only the coupling will rattle in an inadmissible way when operated, which results in a strong abrasion, but also a relatively great axial movement of the clutching member is required for the operation of the coupling.

For the elucidation of the invention reference is made to the accompanying drawing, in which:

Fig. 1 shows partially an elevational view, partially a longitudinal sectional view of the upper half of a back-pedalling brake and freewheel hub according to the invention;

Fig. 2 illustrates a front view of a coupling ring used in the hub shown in Fig. 1;

Fig. 3 is on a larger scale a cross sectional view of a portion of a clutching member and said coupling ring during engagement, and Fig. 4 is a side view in elevation of the driving member that is cooperative with the clutching member.

In the drawing 1 designates a wheel hub having flanges 2 and 3 for the connection of the spokes of the rear wheel of a bicycle provided with an auxiliary motor. The hub is provided outside the flange 3 with a cylindrical part 4, on which a sprocket wheel 5 is screwed for the driving of the wheel by means of a motor. At the right hand end the wheel hub is supported by means of a steel ball race 6 and balls 7 on a driving member 8, which in its turn is supported by balls 9 on an axially adjustable cone 10 fixed by means of a nut 11. The driving member 8 is provided with a sprocket wheel 12 connected by means of a chain (not shown) with the crank shaft of the bicycle. Said member rotates about the stationary shaft 13 of the hub. The inner end portion of the driving member is provided with a screw thread 14,, best shown in Fig. 4, and supports thereon a clutching member 15, which is adapted to be inserted with its conical coupling surface 15a into a conical recess or counterconical surface 16a of a coupling ring 16. This coupling ring has an hexagonal periphery (Fig. 2) and fits in a throughgoing central boring of the wheel hub 1, said boring having also a hexagonal cross section. A friction spring 17 acts on the clutching member 15 and is supported by a pressure ring 18 of a multiple disk brake 19, 20 arranged within the wheel hub 1. This pressure ring is able to move in axial direction but held against rotation relatively to the shaft 13. It abuts against the driving member 8.

The end surface of the clutching member facing the pressure ring 18 is provided with teeth 21 adapted to be brought into engagement with teeth 22 of said ring 18. The other end of the wheel hub 1 rests by means of a ball-bearing (not shown) on the shaft 13. With the aid of a strip 23 the shaft 13 is held against rotation.

When the driving member 8 rotates in forward direction the clutching member 15 is screwed to the right by means of the screw thread 14 and thus establishes a coupling between the driving member 8 and the wheel hub 1 through the coupling ring 16.

In order to prevent the cooperating conical surfaces 15a and 16a from slipping the conical surface 15a is provided with very hard teeth 15b having a cross sectional profile in the form of an isosceles triangle having a top angle which is smaller than 90°. The conical surface 15a and the teeth 15b are very hard. The counter-conical surface 16a of the coupling ring is made of softer material. This material is for instance subjected to a refining process, such as a rolling or a drawing process, only. The counterconical surface 16a is provided beforehand by means of a special tool with saw-shaped teeth 16b, of which during forward rotation the front or inoperative flanks have a gentle slope and the rear or operative flanks 16c have a slope corresponding to that of the operative flanks of the teeth 15b. The teeth 16b may be given a height of about 0.002" which is sufficient to guarantee a tight slipless coupling between the parts 15 and 16.

It will be clear that the coupling ring 16 may be provided with teeth 15b and the clutching member 15 with saw-shaped teeth 16b.

What I claim is:

A freewheel hub, preferably a freewheel hub provided with an internally arranged back pedalling brake, for a cycle wheel comprising in combination a rotatable driving member, a screw thread provided on said member, two cooperating conical surfaces constituting together a cone-coupling, a wheel hub associated with one part of said coupling, a clutching member associated with the other part of said coupling and adapted to be axially reciprocated by said screw thread and thereby to establish and to disconnect the coupling between said driving member and said wheel hub, teeth formed on one of the two conical surfaces, the flanks of said teeth enclosing an angle of 90° at the most, saw-shaped teeth formed on the second conical surface and having the same pitch as the teeth of the first conical surface, at least the surface layer of the latter teeth being harder than the material of the toothed second conical surface and the operative flanks and the inoperative flanks of the teeth of the first conical surface having slopes, which are equal to and steeper than the slopes of the operative flanks and the inoperative flanks of the saw-shaped teeth of the second conical surface, respectively.

References Cited in the file of this patent

UNITED STATES PATENTS

| | | |
|---|---|---|
| 1,341,983 | Hughes | June 1, 1920 |
| 2,517,847 | Crossland | Aug. 8, 1950 |